US011379033B2

(12) United States Patent
O'Hern et al.

(10) Patent No.: US 11,379,033 B2
(45) Date of Patent: Jul. 5, 2022

(54) AUGMENTED DEVICES

(71) Applicant: Apple Inc., Cupertino, CA (US)

(72) Inventors: Adam M. O'Hern, Alexander, VA (US); Eddie G. Mendoza, Pacifica, CA (US); Mohamed Selim Ben Himane, Milpitas, CA (US); Timothy R. Oriol, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/019,856

(22) Filed: Sep. 14, 2020

(65) Prior Publication Data

US 2021/0096638 A1 Apr. 1, 2021

Related U.S. Application Data

(60) Provisional application No. 62/906,379, filed on Sep. 26, 2019.

(51) Int. Cl.
*G06F 3/04815* (2022.01)
*G06F 3/04886* (2022.01)
*G06F 3/01* (2006.01)
*G06F 3/0354* (2013.01)
*G06F 3/0489* (2022.01)

(52) U.S. Cl.
CPC ............. *G06F 3/011* (2013.01); *G06F 3/017* (2013.01); *G06F 3/03545* (2013.01);
(Continued)

(58) Field of Classification Search
None
See application file for complete search history.

(56) References Cited

U.S. PATENT DOCUMENTS 11,023,035 B1 * 6/2021 Atlas ..................... G06F 3/014
2010/0156787 A1 * 6/2010 Katayama ............. G06F 3/0304
345/157

(Continued)

FOREIGN PATENT DOCUMENTS

| CN | 110069230 A | 7/2019 |
| WO | 2012135546 | 10/2012 |
| WO | 2019067642 | 4/2019 |

OTHER PUBLICATIONS

"Introducing the Logitech BRIDGE SDK"; Vive team; https://blog.vive.com/us/2017/11/02/introducing-the-logitech-bridge-sdk; Nov. 11, 2017, pp. 1-6.

(Continued)

*Primary Examiner* — Linda Huynh
(74) *Attorney, Agent, or Firm* — Thompson Hine LLP (57) ABSTRACT

Implementations use a first device (e.g., an HMD) to provide a CGR environment that augments the input and output capabilities of a second device, e.g., a laptop, smart speaker, etc. In some implementations, the first device communicates with a second device in its proximate physical environment to exchange input or output data. For example, an HMD may capture an image of a physical environment that includes a laptop. The HMD may detect the laptop, send a request the laptop's content, receive content from the laptop (e.g., the content that the laptop is currently displaying and additional content), identify the location of the laptop, and display a virtual object with the received content in the CGR environment on or near the laptop. The size, shape, orientation, or position of the virtual object (e.g., a virtual monitor or monitor extension) may also be configured to provide a better user experience.

16 Claims, 6 Drawing Sheets

(52) U.S. Cl.
CPC ...... *G06F 3/04815* (2013.01); *G06F 3/04886* (2013.01); *G06F 3/04897* (2013.01)

(56) References Cited

U.S. PATENT DOCUMENTS

| | | | | |
|---|---|---|---|---|
| 2011/0138317 | A1* | 6/2011 | Kang | H04N 21/43615 715/780 |
| 2012/0032955 | A1 | 2/2012 | Matsuda | |
| 2013/0307875 | A1* | 11/2013 | Anderson | G06F 3/04815 345/633 |
| 2014/0035819 | A1* | 2/2014 | Griffin | G06F 3/0238 345/168 |
| 2014/0092014 | A1* | 4/2014 | Srinivasan | G06F 3/017 345/158 |
| 2015/0234454 | A1* | 8/2015 | Kurz | H04N 5/33 345/156 |
| 2016/0180589 | A1 | 6/2016 | Bean et al. | |
| 2017/0076502 | A1* | 3/2017 | Chen | G06F 3/04886 |
| 2017/0131964 | A1* | 5/2017 | Baek | G06T 19/006 |
| 2017/0168296 | A1 | 6/2017 | Giwnewer et al. | |
| 2017/0308258 | A1* | 10/2017 | Xu | G06F 13/14 |
| 2018/0025248 | A1* | 1/2018 | Shan | G06V 30/373 382/189 |
| 2018/0164589 | A1* | 6/2018 | Watanabe | G02B 27/0101 |
| 2018/0350150 | A1 | 12/2018 | Powderly et al. | |
| 2019/0056791 | A1 | 2/2019 | Holz et al. | |
| 2019/0196710 | A1 | 6/2019 | Jiang et al. | |
| 2019/0212901 | A1* | 7/2019 | Garrison | G06F 3/1454 |
| 2020/0201515 | A1* | 6/2020 | Moon | G06F 3/04815 |
| 2020/0265750 | A1* | 8/2020 | Marquinez | G06F 3/0325 |

OTHER PUBLICATIONS

Goode, Lauren; "Houzz has a new AR mode that lets you try furniture before you buy"; The Verge; Tech/Circuit Breaker; May 3, 2017, pp. 1-3.

"This Guy turned his iPhone into a portal, and soon you can too"; JAMF/NOW; https://www.imore.com/check-out-amazing-optical-illusion-created-arkit; Jun. 11, 2019; pp. 1-9.

"The Parallax View on the App Store"; https://itunes.apple.com/us/app/theparallaxview/id352818700?mt=8; Jun. 11, 2019; pp. 1-3.

Lopez, David; Oehlberg, Lora; Doger, Candemier; and Isenberg, Tobias; "Towards an Understanding of Mobile Touch Navigation in a Stereoscopic Viewing Environment for 3D Data Exploration"; IEEE Transactions on Visualization and Computer Graphics, Institute of Electrical and Electronics Engineers, 2016, 22 (5), pp. 1616-1629.

Aleksandrova, Mary; "Augmented Reality in Education: The Hottest EdTech Trend 2018 and How to Apply It to Your Business"; https://easternpeak.com/blog/augmented-reality-in-education-the-hottest-edtech-trend-2018; Apr. 24, 2018, pp. 1-18.

Mike; "HoloLens 'Final Fantasy XIV' Concept Video Shows AR as a Perfect 'Second Screen' for Today's Games" https://pxvr.com/hololens-final-fantasy-xiv-concept-video-shows-ar-as-a-perferct-second-sc..; Feb. 6, 2017; pp. 1-5.

Aguilar, Nelson; "How to Use Augmented Reality to Try on the Apple Watch with Your iPhone"; https://mobile-ar.reality.news/how-to/use-augmented-realit-try-apple-watch-with-your-ip..; Mar. 27, 2015; pp. 1-5.

Brennan, Dominic; Road Tovr; "4 Virtual Reality Desktops for Vive, Rift and Windows VR Compared", https://www.roadtovr.com/virtual-reality-desktop-compared-oculus-rift-htc-viv/;Jan. 3, 2018; pp. 1-5.

PCT, European Patent Office (ISA/EP), International Search Report and Written Opinion of the International Searching Authority, International Application No. PCT/US2020/050825, 13 pages (dated Jan. 13, 2021).

Lee, Johnny, "Low-Cost, Multi-Touch Whiteboard Using the Wiimote" (Dec. 7, 2007) p. 1, XP054981165, retrieved from the internet on Dec. 3, 2020, https://www.youtube.com/watch?v=5s5EvhHy7eQ.

* cited by examiner

AUGMENTED DEVICES

CROSS-REFERENCE TO RELATED APPLICATIONS

This application claims the benefit of U.S. Provisional Application Ser. No. 62/906,379 filed Sep. 26, 2019, which is incorporated herein in its entirety.

TECHNICAL FIELD

The present disclosure generally relates to providing content on electronic devices, and in particular, to systems, methods, and devices that provide computer-generated reality (CGR) environments that are based on physical environments that include other electronic devices.

BACKGROUND

Many electronic devices are configured with input and output capabilities. For example, a laptop computing device may include a display and a keyboard that are used to display content and receive user input, respectively. Similarly, a smart watch may include a touchscreen that both displays content and receives input. In another example, a smart home speaker device may be configured to produce audio output via a speaker and receive audible voice commands as input via a microphone. Additional devices may be used to supplement the input and output capabilities of an electronic device. For example, a user may connect a larger monitor to a laptop or use a head-mounted device (HMD) to view a virtual screen corresponding to a laptop's output (e.g., a virtual desktop). However, existing techniques that use one device to supplement the output or input capabilities of another device may be limited with respect to capability, usability, or efficiency and generally may not provide user experiences that sufficiently augment the input and output capabilities of those electronic devices.

SUMMARY

Implementations disclosed herein use a first device to provide a CGR environment that augments the input and output capabilities of a second device. In some implementations, a first device (e.g., a head mounted device (HMD)) provides a CGR environment that includes a view of the physical environment that includes one or more other electronic devices, e.g., laptops, televisions, smart speakers, mobile devices, watches, smart speakers, Internet of Things (JOT) devices, etc. The HMD augments an output or input capability of a detected, content-producing electronic device present in that physical environment. In some implementations, the first device (e.g., the HMD) communicates with a device in the physical environment to exchange input or output data. For example, an HMD may capture an image of a physical environment that includes a laptop device. The HMD may detect the laptop device, send a request for content to the laptop, receive visual content from the laptop (e.g., the content that is currently on the laptop's physical display and additional content), and display a virtual object in the CGR environment on or near the view of laptop. For example, the HMD may display a virtual object that includes the content or the additional content. The virtual object be positioned in the CGR environment based on the position of the laptop. For example, the CGR environment may include a view of the physical environment with a virtual monitor positioned at, around, or otherwise based on the position of the laptop's real display. For example, the HMD may display the laptop's current content and additional content on a virtual screen that is bigger than the actual screen and positioned in the CGR environment based on the position of the actual screen.

In some implementations, an electronic device uses a processor to perform a method of using a first device to provide a CGR environment that augments the input and output capabilities of a second device. The method involves obtaining images of a physical environment (e.g., video for video passthrough) and identifying a second device in the physical environment. For example, the second device may be detected via proximity-based detection or computer vision. The method presents a CGR environment that includes a view of at least a portion of the images and that augments an output capability or an input capability of the second device.

In some examples, the method may identify augmented content corresponding to visual content that the second device produces for display on a display of the second device and may position a virtual screen with the augmented content in the CGR environment based on a position of the display of the second device. The virtual screen may differ from the display of the second device with respect to size, shape, or orientation to improve the user experience.

In some examples, the second device displays content without the viewpoint-dependent appearance (e.g., without real shine or reflection or other change based on user or device movement), and the method generates or identifies corresponding augmented content that instead has a viewpoint-dependent appearance (e.g., content that will change in appearance due to user or device movement). For example, metal may be displayed on a laptop monitor with a fixed appearance based on an assumed viewing position and, in contrast, the metal may be displayed on a virtual monitor on an HMD providing a CGR environment with an appearance that varies as the user or laptop moves relative to one another, e.g., based on changing reflections.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
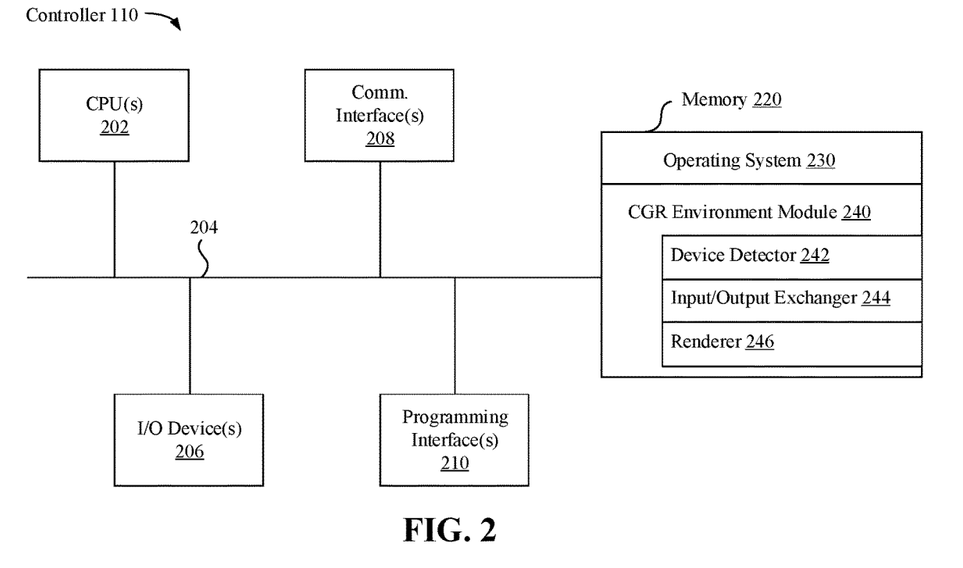
FIG. 2 is a block diagram of an example controller in accordance with some implementations.
Figure 3:
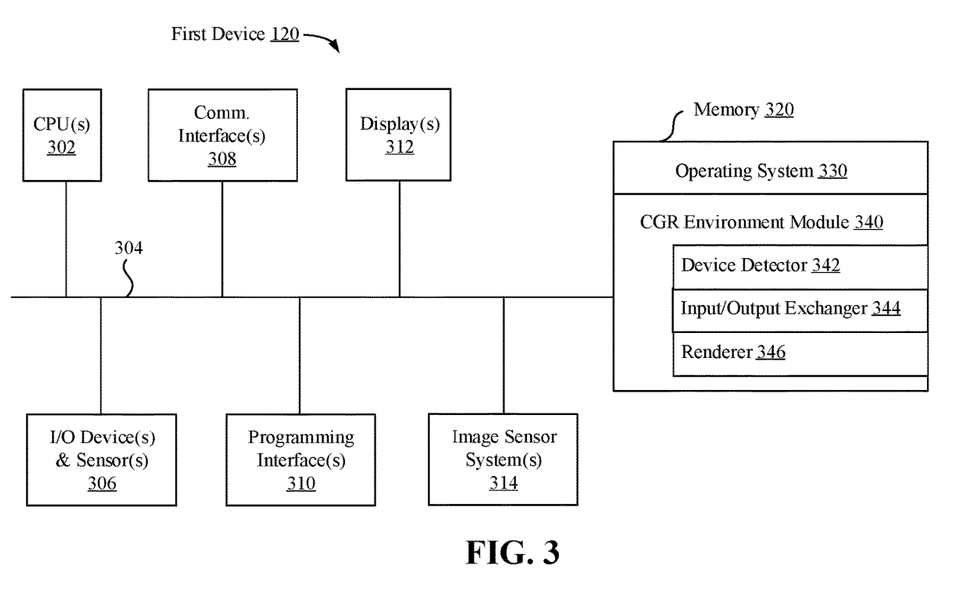
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a hand-held device that provides a computer-generate reality (CGR) environment, other implementations do not necessarily involve a hand held device and may involve other types of devices capable of providing a CGR environment, including, but not limited to, wearable electronic devices, other mobile devices, laptops, desktops, gaming devices, and other devices that include or use image capture devices.

Figure 1:
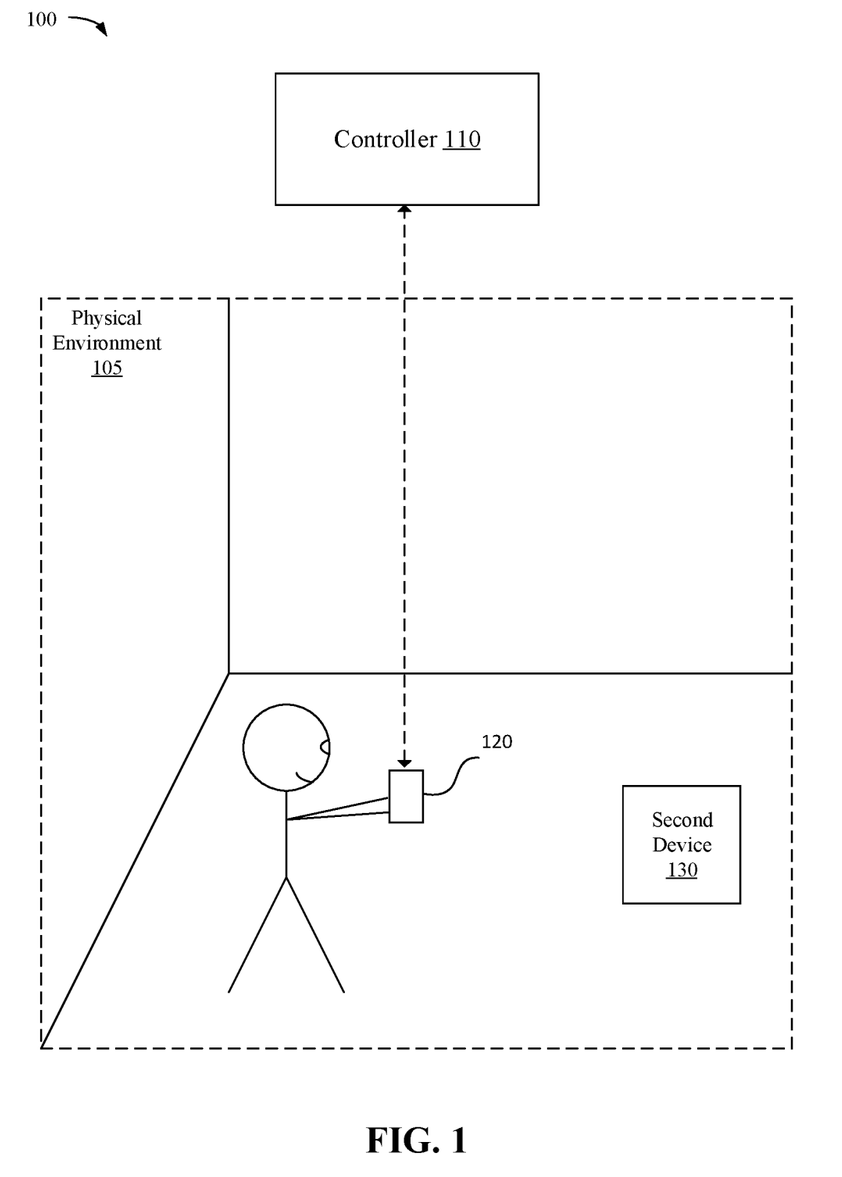
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110, a first device 120, and a second device 130, one or more of which may be in a physical environment 105. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) experience for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the first device 120 via one or more wired or wireless communication channels 144 (e.g., BLUETOOTH, IEEE 802.11x, IEEE 802.16x, IEEE 802.3x, etc.).

In some implementations, the first device 120 is configured to present the CGR environment to the user. The first device 120 is described in greater detail below with respect to FIG. 3. In some implementations, the functionalities of the controller 110 are provided by or combined with the first device 120, for example, in the case of an electronic device that functions as a stand-alone unit.

According to some implementations, the first device 120 presents a computer-generated reality (CGR) environment to the user while the user is present within the physical environment 105. A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the computer-generated reality (CGR) module 240 includes a device detector 242, an input/output exchanger 244, and a renderer 246. The device detector 242 is configured to detect devices that are within the physical environments that corresponds to CGR environments provided by the CGR module 240. For example, the device detector 242 may include a computer vision algorithm or machine learning model that identifies one or more objects in images of the physical environment. In another example, the device detector 242 identifies devices that are within a predetermined proximity based on device location information. In another example, the device detector 242 identifies proximate devices based on those devices being accessible via a particular communication medium (e.g., BLUETOOTH, IEEE 802.11x, IEEE 802.16x, IEEE 802.3x, etc.) associated with a limited communication range.

The input/output exchanger 244 is configured to send messages, e.g., via wired or wireless communication, with the second electronic device 130. For example, the input/output exchanger 244 may receive content from the second electronic device 130 corresponding to an output or input capability of the second electronic device 130, e.g., the visual content currently on a display of the second electronic device 130 and associated supplemental content. In another example, the input/output exchanger 244 may recognize input in the CGR environment (e.g., movement of a user's hand, body, or a user held device) and provide data corresponding to such input to the second electronic device 130.

The renderer 246 is configured to provide the CGR environment. For example, the renderer may utilize image content (e.g., video content) from an image sensor of the first device 120 and additional virtual content to provide views (e.g., frames that depict a view of a 3D environment from a viewpoint) of the CGR environment. In some implementations, the renderer 246 uses a ray tracing technique to produce a view of 3D content from a viewpoint associated with a current position of the first device 120.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the first device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the first device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an CGR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the first device 120 includes a single display. In another example, the first device 120 includes a display for each eye of the user.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a computer-generated reality (CGR) module 340.

The operating system 330 includes procedures for handling various basic system services and for performing hardware dependent tasks.

In some implementations, the computer-generated reality (CGR) module 340 includes a device detector 342, an input/output exchanger 344, and a renderer 346. The device detector 342 is configured to detect devices that are within the physical environments that corresponds to CGR environments provided by the CGR module 340. For example, the device detector 342 may include a computer vision algorithm or machine learning model that identifies one or more objects in images of the physical environment. In another example, the device detector 342 identifies devices that are within a predetermined proximity based on device location information. In another example, the device detector 342 identifies proximate devices based on those devices being accessible via a particular communication medium (e.g., BLUETOOTH, IEEE 802.11x, IEEE 802.16x, IEEE 802.3x, etc.) associated with a communication range.

The input/output exchanger 344 is configured to send messages, e.g., via wired or wireless communication, with the second electronic device 130. For example, the input/output exchanger 344 may receive content from the second electronic device 130 corresponding to an output or input capability of the second electronic device, e.g., the visual content currently on a display of the second electronic device 130 and associated supplemental content. In another example, the input/output exchanger 344 may recognize input in the CGR environment (e.g., movement of a user's hand, body, or a user held device) and provide data corresponding to such input to the second electronic device 130.

The renderer 346 is configured to provide the CGR environment. For example, the renderer may utilize image content (e.g., video content) from an image sensor of the first device 120 and additional virtual content to provide views (e.g., frames that depict a view of a 3D environment from a viewpoint) of the CGR environment. In some implementations, the renderer 346 uses a ray tracing technique to produce a view of 3D content from a viewpoint associated with a current position of the first device 120.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
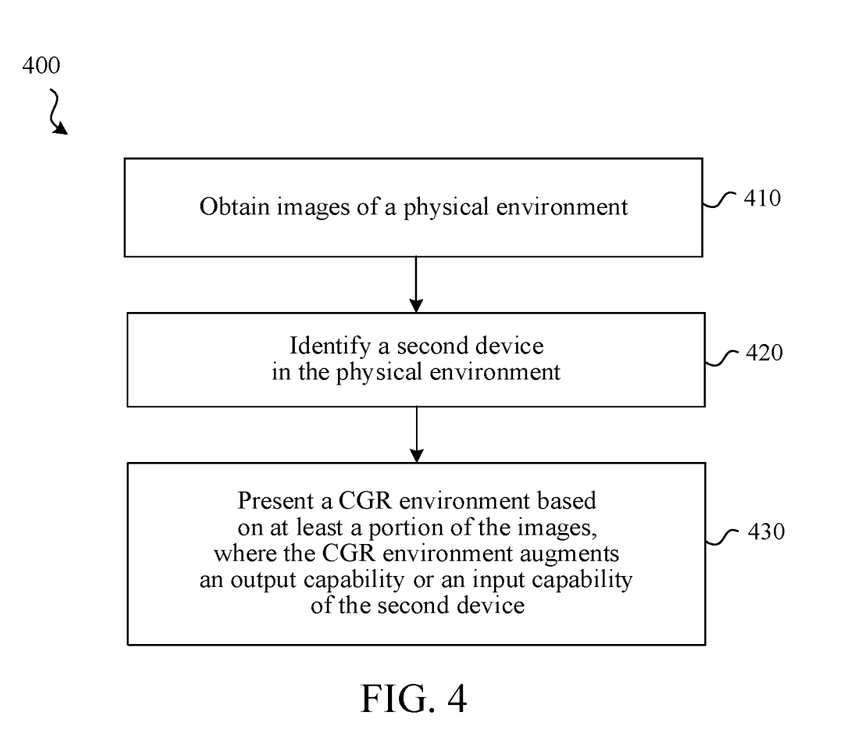
FIG. 4 is a flowchart illustrating an exemplary method of using a first device to provide a CGR environment that augments the input and output capabilities of a second device.

FIG. 4 is a flowchart illustrating an exemplary method 400 of using a first device to provide a CGR environment that augments the input and output capabilities of a second device. In some implementations, the method 400 is performed by a device (e.g., controller 110 or first device 120 of FIGS. 1-3). The method 400 can be performed at a mobile device, HMD, desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 involves obtaining images of a physical environment. For example, a sequence of images or video may be captured via a camera on a head-mounted device (HMD), a mobile device, or any other device providing one or more cameras configured to capture images of a physical environment.

At block 404, the method 400 involves identifying a second device in the physical environment. The second device may be any electronic device that includes an input capability and/or an output capability, e.g., being capable of receiving input and/or producing output. Input may be received via an integrated device or peripheral device such as a mouse, keyboard, touchscreen, styles, or any other device that a user interacts with using physical contact, gestures, speech, gaze direction, eye movement, and the like. Output may be provided via an integrated device such as a monitor, projector, touchscreen, speaker, haptic output device or any other device that produces an appearance, sound, movement, or other change that a user perceives via one of his or her natural senses.

In some implementations, identifying the second device is based on determining that the first device and second device are within a predetermined proximity of one another. For example, each of the first and device may track their own respective locations via sensors or communication with external trackers (e.g., GPS, signal-based tracking, etc.) and the locations may be compared to determined whether the devices are within a predetermined proximity of one another.

In some implementations, identifying the second device is based on identifying the second device based on computer vision. For example, a machine learning model may be trained to identify objects, such as laptops, mobile devices, etc. in the images of the physical environment. In some implementations, a user is associated with multiple specific devices, e.g., a user account may identify a mobile phone model number, a laptop model number, etc., and the user-specific device information is used to identify the second device in images of a physical environment. The first and second devices may both identify one or more unique objects in their respective environments via an image or other sensor. The relative locations and orientations of the devices may be inferred based on identifying the same unique object(s), e.g., both devices detecting a particular painting on the wall.

In some implementations, identifying the second device is based on communicating wirelessly with the second device. For example, the first device and second device may communicate with one another wirelessly using a communication medium that has a limited range. In another example, the devices are each in communication with the same device, e.g., the same WIFI hotspot, etc., and the locations or distances of the device relative to one another are inferred based on this common communication connection point. The devices may exchange location and other information with one another to facilitate a determination that the devices are within the same physical environment and the devices' relative locations.

In some implementations, identifying the second device is based on identifying a symbol or other identifier displayed on a display of the second device. For example, the second device may display a bar code, QR code, or other symbol identifying the device and this displayed symbol may be recognized and located in images of the physical environment.

In some implementations, a depth sensor is used to determine a position and geometry of the second device. For example, an RGB-D camera may provide depth values for pixels of images of the physical environment including pixels corresponding to the second device's parts, e.g., a laptop's keyboard keys, display screen, etc., in the physical environment. Other image-based localization techniques, e.g., simultaneous localization and mapping (SLAM) techniques, may additionally or alternatively be used to determine the location of the second device and its parts relative to the first device or in the images of the physical environment.

At block 406, the method 400 presents a CGR environment based on at least a portion of the images, where the CGR environment augments an output capability or an input capability of the second device. This may involve presenting a CGR environment including passthrough of at least a portion of the images, where the CGR environment augments an output capability or an input capability of the second device.

In some implementations, the method augments the display of the second device. For example, the method 400 may identify augmented content corresponding to visual content that the second device produces for display on a display of the second device. The method 400 may position a virtual screen in the CGR environment based on a position of the display of the second device. For example, the virtual screen may be positioned at the same location as the display of the second device in the CGR environment so that the user of the CGR environment sees the virtual screen instead of the display of the second device. In some implementations, the virtual screen differs from the display of the second device. For example, the virtual screen may differ with respect to size, shape, display capabilities (e.g., color, brightness, etc.), or orientation. In one example, a virtual screen provides a larger screen than the display of the second device in a position such that the user views the larger virtual screen and can recognize, based on its location (e.g., overlapping, partially overlapping, or proximate the second device), that the virtual screen displays content from the second device.

In these examples, the method 400 augments the output capability of the second device by displaying the augmented content via the virtual screen. The virtual screen may display the same content as the display of the second device, different content than the display of the virtual device, or a combination of the same and different content. In one example, the virtual screen displays all of the content of the display of the second device and additional content (e.g., extra user interface elements, content items, etc.) that is received from the second device. For example, the virtual screen may display the content of an application that is displayed on a second device as well as additional controls of the application that are not displayed on the second device.

In some implementations, the method 400 augments content from the second device by providing content that varies from the content displayed on the second device. For example, the method 400 may display a viewpoint dependent appearance of content for content that is displayed on the second device without the viewpoint-dependent appearance. For example, the second device may be a laptop that displays a metal object without a viewpoint dependent appearance, e.g., the metal object may have an appearance that is static regardless of the position of the viewer such that as a viewer moves or moves the laptop the reflections in the metal remain static. In this example, the method 400 may augment such an appearance of the content displayed on the laptop by displaying within the CGR environment a representation of that metal object that has reflections that instead does move and change based on the viewer moving himself/herself or moving the laptop.

In some implementations, the method 400 augments content from the second device by providing content having a three-dimensional (3D) depth characteristic that differs from the characteristics of the content displayed on the second device. For example, the CGR environment may display a virtual object corresponding the second device's displayed content that is not limited to the flat plane of the second device's display. Instead, the virtual object may be given depths, e.g., buttons may "pop out," etc., and the 3D appearance of the virtual objects may be made realistic by making the objects appearance depend upon viewpoint or using stereo differences in the views provided by eye-specific displays of an HMD. Moreover, the second device may have a flat display that depicts a user interface for creating, editing, or viewing 3D objects, for example, in the context of a 3D modeling application used to design 3D objects for 3D printing. The method 400 may display the user interface that replaces the user interface displayed on the second device with a 3D interface in which such 3D objects are displayed in 3D.

In some implementations, the method 400 augments content corresponding to audio content that is produced by a speaker of the second device. For example, speakers in an HMD used to experience the CGR environment may produce sounds that enhance or improve spatialized audio being provided on the second device. In another example, a virtual object is displayed proximate the second device that provides visual information to supplement the audio being produced by the second device. For example, the method 400 may augment the output capability of the second device by displaying the augmented content via a virtual object near the second device and that provides text or graphics identifying a current song or audiobook being played by the device. If multiple devices are producing sounds, the method 400 may provide virtual objects that identify which device is producing which sounds.

In some implementations, the method 400 augments content corresponding to an input device (e.g., keyboard, mouse, pen, etc.) of the second device. For example, the method 400 may identify augmented content corresponding to an input device of the second device, e.g., identifying hotkey keyboard labels corresponding to an app currently in use on the second device. The method 400 may identify a location of the corresponding input device (e.g., keyboard) and its corresponding features (e.g., the "e" key"). The method 400 may position a virtual object in the CGR environment based on a position of the input device, e.g., positioning a virtual object near the "e" key identifying the hotkey function (e.g., "erase") of the hotkey in the current application. In another example, an electronic pencil input device may be augmented with a graphical indicator identifying an attribute of a user interface feature (e.g., paintbrush color, size, etc.) currently being controlled by the electronic pencil. In another example, the input device is a trackpad and the augmented content is displayed on or near the trackpad to facilitate the user's use of the trackpad. In these examples, the method 400 augments the output capability of the second device by displaying the augmented content via the virtual object in positions relative to an input device that allow a user to associate the augmented content with the input device of the second device.

In some implementations, the method 400 augments the input capabilities of the second device by providing a new or additional mode of user input. For example, where the second device is a laptop having a non-touch display, the CGR environment may recognize touches to the laptop screen as input and provide those inputs to the second device so that the second device can respond as if the second device had a touch screen. In this example, the first device (e.g., HMD) may interpret images that include the user (e.g., the user's hand) and the second device (e.g., its display) and interpret the images to identify a touch location of the user on the second device. In another example, the method 400 identifies body input (e.g., hand gestures, gaze direction, facial expressions, etc.) and provides the input to the second device.

An application on the second device may be configured to receive native inputs from the second device's input mechanisms as well as additional types of inputs from other devices. In some implementations, an inspection algorithm is used to analyze an existing application and automatically add code or functionality to that application to enable the application to receive inputs from additional input types. In some implementations, an application need not be altered, and the inputs received in a CGR environment in non-native input types via the first device may be translated into a form that the application on the second device will recognize. For example, an upward moving hand gesture may be translated into a page up button input that the second device will recognize.

In some implementations, the method 400 augments a second device's content by facilitating interaction of content produced or otherwise vended by the second device with other content of the CGR environment. For example, a cube from an application on a laptop may interact with a virtual cube from an application on an HMD that is providing a CGR environment that includes the laptop.

In some implementations, multiple devices are involved in providing a shared CGR environment. For example, two HMDs in the same physical environment may coordinate with one another and other devices in the physical environment to provide a shared CGR environment. The capabilities of a device in the physical environment such as a laptop may be augmented in the shared CGR environment. For example, the HMDs may display expanded virtual monitors in place of the laptop's monitor in the shared CGR environment.

In some implementations, multiple devices provide processing and storage of data that is used in a shared CGR environment. In such an environment, a user may use one device such as an HMD to view a physical environment that includes one or more other devices that provide processing and storage capabilities that are utilized by the user during his or her experience with the CGR environment. The user may use the processor, applications, and data of a laptop that is viewed through an HMD. This may be more efficient, effective, and intuitive than attempting to have the CGR-providing device, e.g., the HMD, itself mimic or emulate the processing of devices in the environment. Moreover, content associated with one type of device can be injected automatically into a CGR environment and augmented in desirable ways. For example, a mobile device may provide a game that a user can use that is stored on the mobile device and executed by the mobile device's processor. The user can play that game in a CGR environment simply by using the mobile device while using another device (e.g., an HMD) that provides the CGR environment. The user can, for example, enjoy playing the mobile device game while viewing a virtual reality surrounding (e.g., on a virtual beach). Moreover, the experience may be augmented with additional inputs or outputs that may otherwise be unavailable. For example, the CGR environment may provide a larger display, better content, additional input modalities, etc.

Example Augmented Devices

Figure 5:
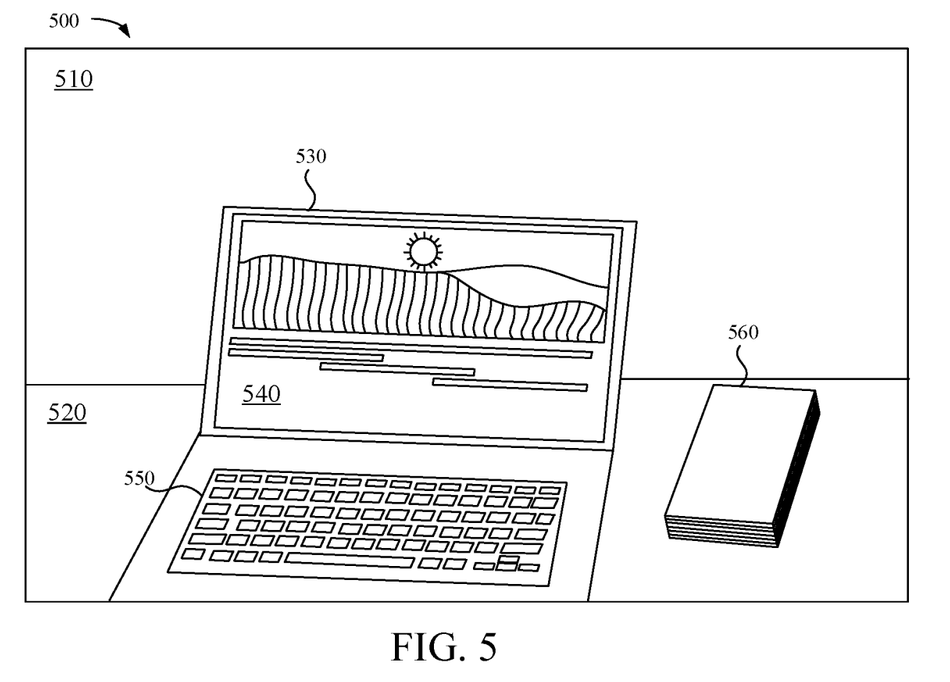
FIG. 5 is a block diagram illustrating a view of a CGR environment that includes video passthrough of a physical environment.

FIG. 5 illustrates a view 500 of a CGR environment that includes video passthrough of a physical environment. In this example, the passthrough video of the physical depicts a wall 510 and a desk 520, upon which a laptop 530 and a book 560 rest. The laptop 530 includes a display 540 displaying content produced by the laptop 530 and a keyboard 550 for receiving input to the laptop 530. In FIG. 5, all of the depictions in the CGR environment are passthrough video of the physical environment.

Figure 6:
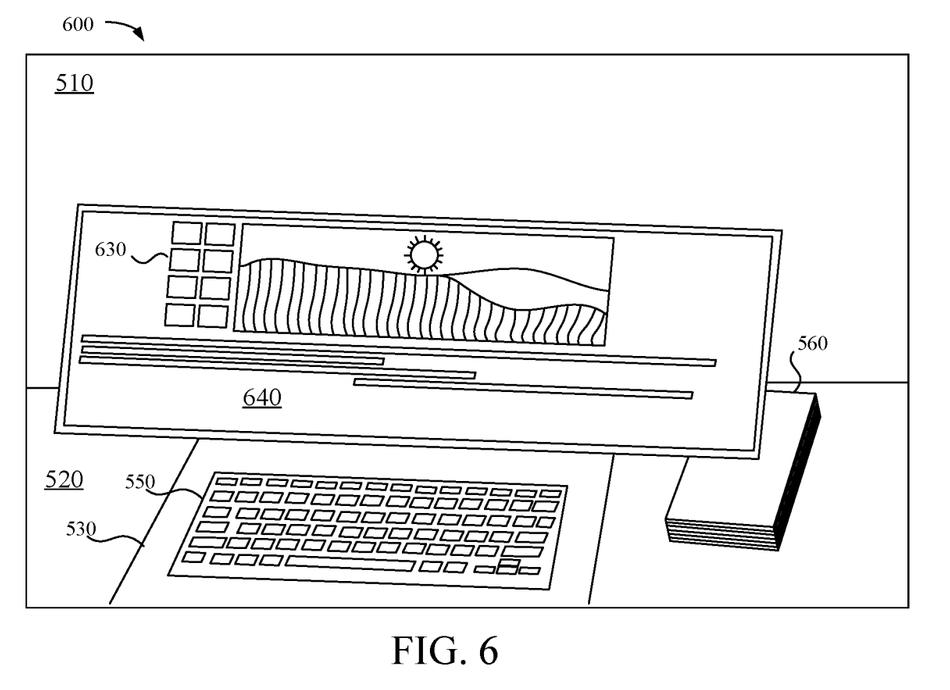
FIG. 6 is a block diagram illustrating a view of a CGR environment that includes video passthrough of a physical environment and virtual content that augments an output capability of a second device of the physical environment.

FIG. 6 illustrates a view 600 of a CGR environment that includes video passthrough of the physical environment of FIG. 5 and virtual content that augments an output capability of the laptop 530 of that physical environment. In this example, the passthrough video of the display 540 of the laptop 530 is replaced with a virtual display 640. The virtual display 640 includes content that is provided by the laptop 530. Specifically, the virtual display 640 includes the content that is actually displayed on the display 540 (FIG. 5) augmented to include additional features (e.g., user interface control 630) to utilize the relatively larger area of the virtual display 640. Moreover, the virtual display 640 is positioned in the CGR environment based on the position of the display 540 (FIG. 5) to be near and overlap the display 540 (FIG. 5), providing a visual indication to the user that the virtual display 640 corresponds to the laptop 530.

Figure 7:
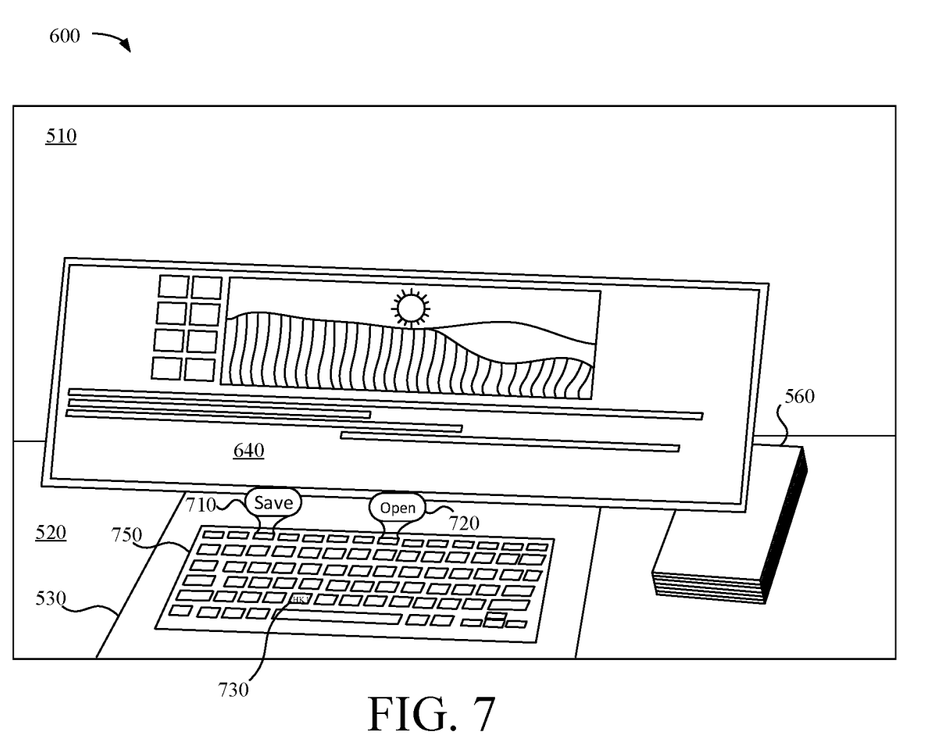
FIG. 7 is a block diagram illustrating a view of a CGR environment that includes video passthrough of a physical environment and virtual content that augments an input capability of a second device of the physical environment.

FIG. 7 illustrates a view 700 of a CGR environment that includes video passthrough of the physical environment of FIG. 5 and virtual content that augments both an output and an input capability of the laptop 530 of that physical environment. In this example, the passthrough video of the display 540 of the laptop 530 is replaced with a virtual display 640. In addition, the passthrough video of the keyboard 550 is augmented to provide augmented keyboard 750. Augmented keyboard 750 overlays virtual content on and around passthrough video of the keyboard 550. In this example, the virtual content includes a first text bubble 710 that graphically indicates that a particular key of the keyboard 550 is associated with a particular hotkey function (e.g., Save) and a second text bubble 710 that graphically indicates that a second particular key of the keyboard 550 is associated with a second particular hotkey function (e.g., Open). In addition, the virtual content includes a virtual key label 730 that overlays another key of the keyboard 550 to provide information about the function of that key in the current application being executed on the laptop 550.

Figure 8:
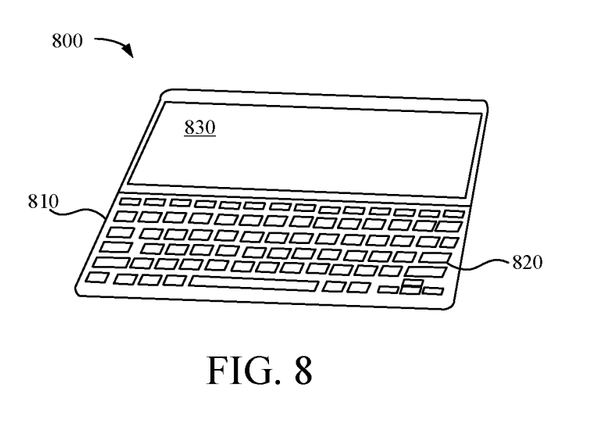
FIG. 8 is a block diagram illustrating a view of a CGR environment that includes video passthrough of a physical environment.

FIG. 8 illustrates a view 800 of a CGR environment that includes video passthrough of a physical environment. In this example, the passthrough video of the physical depicts tablet 810 that includes a touchscreen display that depicts keyboard 820 and a text window 830. In this example, a user of the tablet 810 may touch the touchscreen at locations of keys of the depicted keyboard 820 to input text that is displayed in the text window 830. In this example, with the tablet resting on a flat, horizontal surface, a user may find it convenient to touch the depicted keyboard 820, but desire a different viewing angle for the text window 830.

Figure 9:
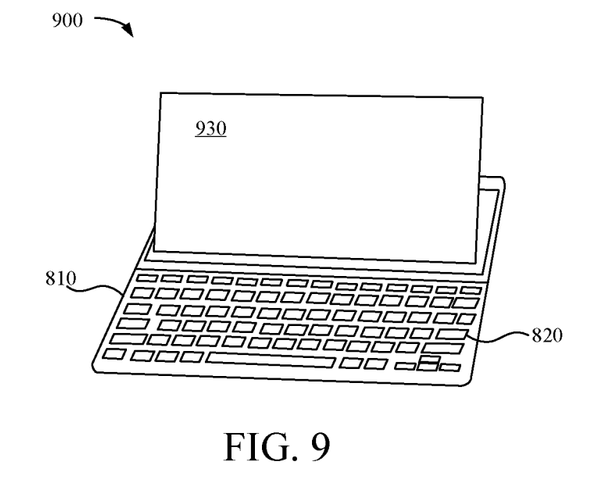
FIG. 9 is a block diagram illustrating a view of a CGR environment that includes video passthrough of a physical environment and virtual content that augments an output capability of a second device of the physical environment.

FIG. 9 illustrates a view of a CGR environment that includes video passthrough of the physical environment of FIG. 8 and virtual content that augments an output capability of the tablet 810 of that physical environment. In this example, the passthrough video of the portion of the touchscreen display corresponding to the text window 830 is augmented with a virtual text window 930 having a viewing angle that may be preferable to the user. The virtual text window 930 includes the content that is actually displayed on the text window 830 (FIG. 8). Moreover, the virtual text window 930 is positioned in the CGR environment based on the position of the text window 830 (FIG. 8) to be near and partially overlap the text window 830, providing a visual indication to the user that the virtual text window 930 corresponds to the tablet 810.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a first device comprising a processor:
   obtaining images of a physical environment, wherein the images include depictions of a second device and a hand of a user touching the second device;
   identifying the second device in the physical environment, wherein the second device comprises a non-touch display; and
   presenting a computer-generated reality (CGR) environment based on at least a portion of the images, wherein the CGR environment augments the input capability of the second device by:

identifying touch interactions on the non-touch display of the second device based on the images, wherein identifying the touch interactions comprises interpreting the images to identify a touch location on the second device of the hand of the user touching the second device; and communicating the touch interactions to the second device, wherein the second device responds to the touch interactions on the non-touch display as touch input.

2. The method of claim 1 further comprising:

identifying augmented content corresponding to visual content that the second device produces for display on a display of the second device;

positioning a virtual screen in the CGR environment based on a position of the display of the second device, wherein the virtual screen differs from the display of the second device with respect to size or shape; and augmenting an output capability of the second device by displaying the augmented content via the virtual screen.

3. The method of claim 1 further comprising:

identifying augmented content corresponding to visual content that the second device produces for display on a display of the second device;

positioning a virtual screen in the CGR environment based on a position of the display of the second device, wherein the virtual screen differs from the display of the second device with respect to orientation; and augmenting an output capability of the second device by displaying the augmented content via the virtual screen.

4. The method of claim 1 further comprising:

identifying augmented content having a viewpoint-dependent appearance corresponding to visual content that the second device produces for display on a display of the second device without the viewpoint-dependent appearance;

positioning a virtual screen in the CGR environment based on a position of the display of the second device; and augmenting an output capability of the second device by displaying the augmented content via the virtual screen.

5. The method of claim 1 further comprising:

identifying augmented content having a three dimensional (3D) depth characteristic corresponding to visual content that the second device produces for display on a display of the second device without the 3D depth characteristic;

positioning a virtual screen in the CGR environment based on a position of the display of the second device; and augmenting an output capability of the second device by displaying the augmented content via the virtual screen.

6. The method of claim 1 further comprising:

identifying augmented content corresponding to audio content that is produced to be output by a speaker of the second device;

positioning a virtual object in the CGR environment based on a position of the second device; and augmenting an output capability of the second device by displaying the augmented content via the virtual object.

7. The method of claim 1 further comprising:

identifying augmented content corresponding to an input device of the second device;

positioning a virtual object in the CGR environment based on a position of the input device; and augmenting an output capability of the second device by displaying the augmented content via the virtual object.

8. The method of claim 7, wherein the input device is a keyboard and the augmented content comprises hotkey labels that are displayed relative to the position of the keyboard.

9. The method of claim 7, wherein the input device is an electronic pencil and the augmented content comprises a graphical indicator identifying an attribute of a user interface feature currently being controlled by the electronic pencil.

10. The method of claim 7, wherein the input device is a trackpad or electronic pencil and the augmented content comprises a graphical representation of content generated based on input from the trackpad or electronic pencil.

11. The method of claim 1 further comprising:

identifying an interaction of a user in the CGR environment; and communicating the interaction to the second device, wherein the second device produces additional output in response to the interaction.

12. The method of claim 1, wherein identifying the second device comprises detecting the second device based on determining that the first device and second device are within a predetermined proximity of one another.

13. The method of claim 1, wherein identifying the second device comprises identifying the second device based on computer vision.

14. The method of claim 1, wherein identifying the second device comprises communicating wirelessly with the second device.

15. A non-transitory computer-readable storage medium, storing program instructions computer-executable on a computer to perform operations comprising:

obtaining images of a physical environment, wherein the images include depictions of a second device and a hand of a user touching the second device;

identifying the second device in the physical environment, wherein the second device comprises a non-touch display; and presenting a computer-generated reality (CGR) environment based on at least a portion of the images, wherein the CGR environment augments the input capability of the second device by:

identifying touch interactions on the non-touch display of the second device based on the images, wherein identifying the touch interactions comprises interpreting the images to identify a touch location on the second device of the hand of the user touching the second device; and communicating the touch interactions to the second device, wherein the second device responds to the touch interactions on the non-touch display as touch input.

16. The non-transitory computer-readable storage medium of claim 15, wherein the operations further comprise:

identifying augmented content corresponding to visual content that the second device produces for display on a display of the second device;

positioning a virtual screen in the CGR environment based on a position of the display of the second device, wherein the virtual screen differs from the display of the second device; and augmenting the output capability of the second device by displaying the augmented content via the virtual screen.

* * * * *